United States Patent [19]

Ohtake

[11] Patent Number: 4,585,518

[45] Date of Patent: Apr. 29, 1986

[54] METHOD OF MANUFACTURING SHADOW MASK

[75] Inventor: Yasuhisa Ohtake, Fukaya, Japan

[73] Assignee: Kabushiki Kaisha Toshiba, Kawasaki, Japan

[21] Appl. No.: 714,551

[22] Filed: Mar. 21, 1985

[30] Foreign Application Priority Data

Mar. 26, 1984 [JP] Japan ................................ 59-56353

[51] Int. Cl.[4] ........................... C23F 1/02; B44C 1/22; C03C 15/00; C03C 25/06

[52] U.S. Cl. .................................... 156/644; 156/640; 156/659.1; 156/664; 252/79.2

[58] Field of Search ............... 156/640, 642, 644, 654, 156/656, 659.1, 661.1, 664; 252/79.2; 430/23, 313, 318

[56] References Cited

U.S. PATENT DOCUMENTS 4,021,279 5/1977 Hirs ................................ 156/664 X
4,420,366 12/1983 Oka et al. ............................ 156/644
4,472,236 9/1984 Tanaka et al. ...................... 156/642

*Primary Examiner*—William A. Powell
*Attorney, Agent, or Firm*—Cushman, Darby & Cushman

[57] ABSTRACT

A method of manufacturing a shadow mask having apertures of precise shape and size, comprises the steps of forming an etching-protective film having a pattern of a number of apertures on a surface of a thin metal plate containing iron and nickel as major components, and etching the thin metal plate using an etching solution with a viscosity of 1 to 5 centipoise (cP) so as to form a number of apertures therein.

9 Claims, 7 Drawing Figures

METHOD OF MANUFACTURING SHADOW MASK

BACKGROUND OF THE INVENTION

I. Field of the Invention

The present invention relates to a method of manufacturing a shadow mask for a color picture tube and, more particularly, to an etching method of a shadow mask material consisting of an iron-nickel alloy.

II. Description of the Prior Art

A shadow mask for a color picture tube is generally made of high-purity low-carbon steel such as rimmed steel or aluminum killed steel. The material is determined with regard to material feed capacity, cost, workability, mechanical strength and the like. However, such a material has a high thermal expansion coefficient (about $12\times10^{-6}$/°C. at a temperature of 0° to 100° C.). In a shadow mask type color picture tube, when the relationship between positions of apertures of the shadow mask and corresponding phosphor layers is varied outside an allowable range, a so-called purity drift inevitably occurs. Particularly, thermal expansion causes a change in a required curvature of the shadow mask, thereby causing mislignment between the apertures of the shadow mask and the phosphor layers. Therefore, various means for eliminating thermal deformation of the shadow mask have been proposed.

For example, a shadow mask which uses an iron-nickel alloy having a low thermal expansion coefficient, e.g., a 36Ni-Fe invar alloy (about $2.0\times10^{-6}$/°C. at a temperature of 0° to 100° C.) or a 42Ni-Fe alloy (about $5.0\times10^{-6}$/°C. at a temperature of 0° to 100° C.) as a raw material has been proposed in Japanese Patent Publication No. 42-25446 and Japanese Patent Disclosure Nos. 50-58977 and 50-68650.

Recently, in a display for a personal computer, teletext, satellite broadcasting, CAPTAIN system and the like, high resolution, high contrast and good image quality are required. In order to meet these requirements, an aperture pitch of the shadow mask has become fine, and an electron beam amount emitted from an electron gun has become large. As a result, a landing reservation of the electron beam on a phosphor screen is decreased and purity drift due to thermal deformation is considerable. Therefore, an iron-nickel alloy with a low thermal expansion coefficient as mentioned above has become increasingly important. However, when an iron-nickel alloy such as invar contains rolled texture, it has a higher etching rate in a direction parallel to a rolling direction than that in a direction perpendicular thereto (direction of thickness) in comparison to a low carbon steel used as a conventional shadow mask material and containing iron as a major component. For this reason, an etching amount undesirably varies, and edges and side walls of apertures are roughened as shown in FIGS. 1A and 1B and 2, thereby forming irregular apertures. Therefore, sizes of apertures slightly vary and mask uniformity is degraded. In order to eliminate the problem of rolled texture, it is proposed that the material is subjected to a thermal treatment after cold rolling so as to adjust a size of a crystal grain. However, in such a case, an etching rate in a crystal plane is higher than that in a crystal grain boundary unlike in the case of pure iron. Then, a shadow mask material to be etched undesirably comprises a polycrystalline structure having surfaces some of which can be easily etched and others which cannot. Therefore, when this shadow mask material is etched, apertures having nonuniform shapes and slightly different sizes are formed, thus obtaining a shadow mask having a low mask uniformity. When the size of apertures of the shadow mask is large as in a conventional color picture tube, the disadvantageous effects caused by the nonuniformity of apertures are negligible, because the area of roughened edges and side walls is small with respect to the overall area of apertures. However, in a high resolution color picture tube, when a size and pitch of apertures of the shadow mask are small, the area occupying of the roughened edges which cause a slight variation of the aperture sizes is large with respect to the overall area of apertures, thus degrading white uniformity of the color picture tube.

SUMMARY OF THE INVENTION

It is an object of the present invention to provide a method of manufacturing a shadow mask in which a shadow mask material is etched at a uniform etching rate, thereby forming apertures with high precision.

According to the present invention, there is provided a method of manufacturing a shadow mask, comprising the steps of: forming an etching-protective film having a pattern of a number of apertures on a surface of a thin metal plate containing iron and nickel as major components; and etching the thin metal plate using an etching solution of a viscosity of 1 to 5 centipoise (cP) so as to form a number of apertures in the thin metal plate.

The viscosity of the etching solution is preferably 2 to 5 cP, more preferably, 2.5 to 4 cP.

A ferric chloride aqueous solution, a copper (II) chloride aqueous solution, and mixed acid of chromic acid and sulfuric acid can be used as the etching solution.

When the ferric chloride aqueous solution is used as the etching solution, the concentration thereof is preferably 35 to 50% by weight, and the temperature thereof is preferably 40° to 70° C., more preferably, 50° to 60° C.

DETAILED DESCRIPTION OF THE PREFERRED EMBODIMENT

Figure 1A:
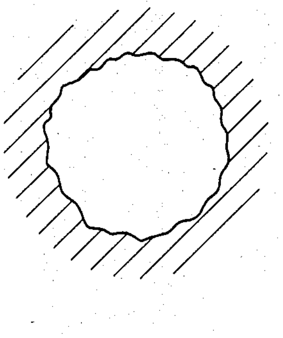
FIGS. 1A and 1B are plan views for explaining an edge shape of apertures in a conventional shadow mask.
Figure 1B:
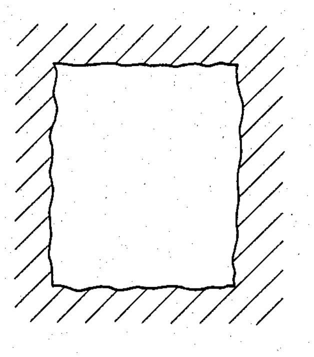
Figure 2:
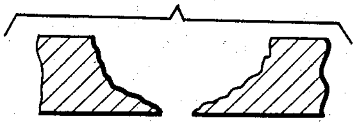
FIG. 2 is a sectional view for explaining a side wall shape of the conventional shadow mask.

An example using a shadow mask material made of an iron-nickel alloy as an invar will be described hereinafter.

The table below shows a composition of the invar.

TABLE

| C | Mn | Si | P | S | Al | Ni(+Co) | Fe |
|---|---|---|---|---|---|---|---|
| 0.009 | 0.47 | 0.13 | 0.005 | 0.002 | — | 36.5 | balance |

The shadow mask material made of the invar having the composition shown in the Table above was used and a shadow mask for a high resolution having a number of round apertures with a pitch of 0.3 mm and an aperture diameter of 140 μm was manufactured by the following procedure.

In order to remove rolling oil and rust-preventing oil applied during cold-rolling, the shadow mask material was degreased and washed using a high-temperature alkali solution. A photosensitive solution of alkali milk caseinate and ammonium dichromate was coated on two surfaces of the shadow mask material and was dried so as to form photosensitive films with a thickness of 5 μm. A negative glass plate having large aperture negative image with a diameter of 210 μm was attached to one photosensitive film on the shadow mask material, and a negative glass plate having small apertures with a diameter of 75 μm was attached to the other photosensitive film thereon. Thereafter, the resultant structure was exposed using a 5-kW superhigh pressure mercury lamp spaced by about 1 m for about 40 seconds, thereby forming latent images of apertures on the respective photosensitive films. The latent images were devellopped using warm pure water at a temperature of about 40° C. Then, the resultant structure was subjected to drying and burning and etching-protective films having a pattern of a number of apertures were formed on two surfaces of the shadow mask material.

The shadow mask material having the etching-protective films on two surfaces thereof was then etched. In this case, etching was performed by spraying a ferric chloride solution. An etching rate of this reaction is determined by diffusion of ($Fe^{3+}$) in an etching solution. More specifically, at an etching interface between the etching solution and the shadow mask material, $Fe^{3+}$ in the etching solution is reduced by the reaction of $Fe+2Fe^{3+} \rightarrow 3Fe^{2+}$, thus being turned into $Fe^{2+}$ which has no etching ability. Therefore, a total iron ion concentration in the etching solution near the etching interface becomes higher than that in the bulk etching solution. As a result, a viscosity of the etching solution near the etching interface is increased, thus forming a viscous layer thereon. When the viscous layer is thick, since migration of $FE^{3+}$ as an etching ion from the bulk etching solution to the etching interface is inhibited, the etching rate is low. On the other hand, when the viscous layer is thin, the etching rate is high. Generally, when a solution temperature is high and a specific gravity of the solution is low, an etching rate is high because a viscous layer near an etching interface is thin and migration of etching ions to the etching interface is increased.

Figure 3A:
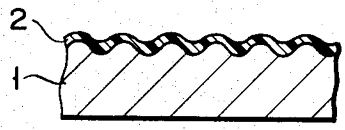
FIGS. 3A and 3B are respectively sectional views showing a state of a viscous layer at an etching interface of a shadow mask material.
Figure 3B:
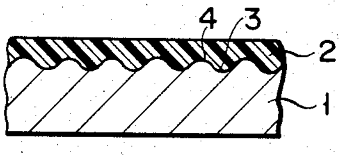

An invar alloy constituting the shadow mask material has various crystal planes. Among these crystal planes, a {100} plane is most easily etched, and a {110} plane is the next most easily etched. When the shadow mask material made of the invar alloy having such various crystal planes of different etching rates is subjected to etching, if a viscous layer 2 formed on a shadow mask material 1 is thin as shown in FIG. 3A, a migration rate of $Fe^{3+}$ as etching ions cannot be lowered. Therefore, crystal planes which are active with respect to etching are etched prior to inactive ones until etching is completed. For this reason, etching cannot be uniformly performed. Conversely, as shown in FIG. 3B, when the viscous layer 2 has a proper thickness, recesses 3 which are active with respect to etching are covered with the thick viscous layer and projections 4 which are inactive with respect thereto are covered with the thin viscous layer. Thus, the projections as inactive crystal planes are etched prior to the recesses as active crystal planes, resulting in uniform etching.

Figure 4:
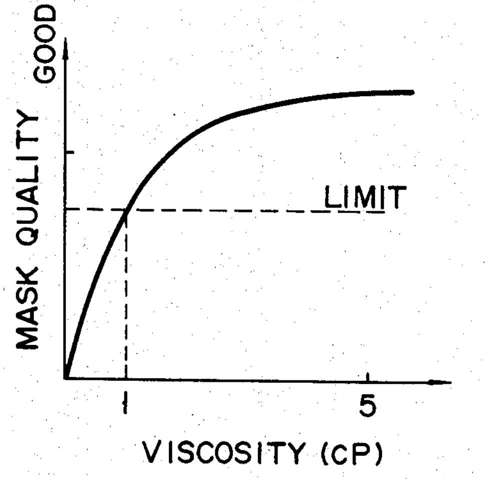
FIG. 4 is a graph showing the relationship between a viscosity of an etching solution and quality of the shadow mask.
Figure 5:
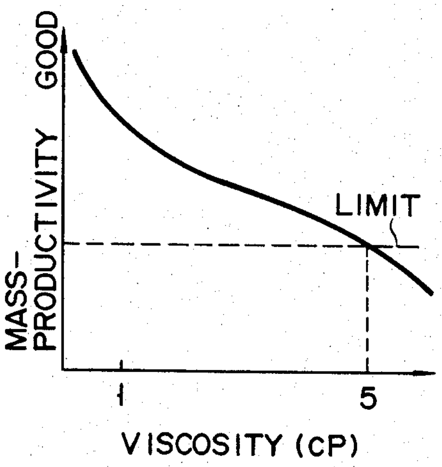
FIG. 5 is a graph showing the relationship between the viscosity of the etching solution and the mass-producibility of the shadow mask.

The present inventors found that in order to perform etching suitable for a material having various crystal planes with different etching rates such as an invar, the thickness of the viscous layer must be controlled and the viscosity of the etching solution greatly influences the thickness of the viscous layer. Then, the present inventors examined the relationships between the viscosity of the etching solution and quality of the shadow mask, and between the viscosity of the etching solution and mass-producibility. The obtained results are respectively shown in FIGS. 4 and 5. As a result, when the viscosity of the etching solution is controlled to 1 to 5 cP, preferably, 2 to 5 cP, more preferably, 2.5 to 4 cP, edges and side walls of apertures are not roughened and apertures having a precise shape and size can be formed, thereby obtaining a high quality shadow mask. Note that a change in the viscosity in FIGS. 4 and 5 was achieved by varying the content of ferric chloride solution at a temperature of 55° C. within the range between 35 and 50% by weight.

Setting of the viscosity of the etching solution within the above range depends upon spray etching conditions, i.e., a spray pressure, a spray angle, a spray flow rate and the like. Therefore, the optimum viscosity for each etching apparatus and etching conditions must be experimentally selected. However, in any case, when the viscosity of the etching solution was 1 cP or less, the viscous layer became too thin and the etching rate was too high. For this reason, the shadow mask having apertures with smooth edges and side walls could not be obtained. On the other hand, when the viscosity of the etching solution exceeded 5 cP, the shadow mask of required quality could be manufactured, but could not be mass produced.

The viscosity of the etching solution is influenced by a solution temperature and a concentration thereof. When the solution temperature is less than 40° C., mass-producibility is degraded, and when it exceeds 70° C., since a considerable amount of etching solution is evaporated, the composition of the solution becomes unstable and the etching resistivity of the photosensitive film is decreased, thus easily forming pin holes. Therefore, the temperature of the etching solution preferably falls within the range between 40° and 70° C., more preferably, between 50° and 60° C. When the concentration of the etching solution, e.g., a ferric chloride solution is less than 35% by weight, fatigue of the etching solution becomes considerable and therefore etching ability cannot be constantly controlled. However, when the concentration of the etching solution exceeds 50% by weight, even if the solution temperature is increased, the etching rate is too low and is not suitable for mass production. In addition, since this concentration is near a saturation point, it cannot be stably maintained. Therefore, the concentration of the etching solution preferably falls within the range between 35 and 50% by weight.

Ferric chloride contained in the etching solution is turned into ferrous chloride by etching of the shadow mask material, thus losing etching ability. However, when a chlorine gas is introduced, ferrous chloride can be turned back into ferric chloride. Therefore, an etching process line with a mechanism for the introduction of a chlorine gas, addition of water, and temperature control is preferably used.

Under the above conditions, the shadow mask material having two surfaces coated with the etching-protective films was subjected to etching so as to form apertures of a desired shape and size, and thereafter, the resultant structure was subjected to steps of washing with water, removal of etching-protective films using a high temperature alkali solution, washing with water, and drying, thus obtaining the shadow mask.

In the above example, the ferric chloride aqueous solution is used as the etching solution. However, the present invention is not limited to this. For example, copper (II) chloride, and a mixed acid of chromic acid and sulfuric acid can be used. In the above example, 36Ni-invar is used as a material of the shadow mask. However, the present invention is not limited to this, and Ni-Fe alloy containing 30 to 45% of Ni is preferably used. For example, 42Ni alloy, a super invar such as 32Ni-5Co alloy or the like which are generally termed invar type alloys can be used.

As described above, according to the present invention, the thickness of a viscous layer formed on an etching interface is controlled by maintaining the viscosity of an etching solution within a predetermined range. Thus, variation in an etching rate in a surface of a shadow mask material is controlled and uniform etching can be performed. As a result, apertures having a required shape and size can be formed, thereby obtaining a color picture tube having a high quality shadow mask and good white uniformity.

What is claimed is:

1. A method of manufacturing a shadow mask, comprising the steps of: forming an etching-protective film having a pattern of a number of apertures on a surface of a thin metal plate containing iron and nickel as major components; and etching said thin metal plate using an etching solution with a viscosity of 1 to 5 centipoise (cP) so as to form a number of apertures in said thin metal plate.

2. A method according to claim 1, wherein a viscosity of the etching solution falls within a range between 2 and 5 cP.

3. A method according to claim 2, wherein the viscosity of the etching solution falls within a range between 2.5 and 4 cP.

4. A method according to claim 1, wherein the etching solution is a ferric chloride solution.

5. A method according to claim 4, wherein a concentration of the etching solution falls within a range between 35 and 50% by weight.

6. A method according to claim 4, wherein a temperature of the etching solution falls within a range between 40° and 70° C.

7. A method according to claim 6, wherein a temperature of the etching solution falls within a range between 50° and 60° C.

8. A method according to claim 1, wherein the step of etching is performed by a spray method.

9. A method according to claim 1, wherein said thin metal plate is made of Ni-Fe alloy containing 30 to 45% Ni.

* * * * *